United States Patent [19]

Sasaki et al.

[11] Patent Number: 5,309,367
[45] Date of Patent: May 3, 1994

[54] PITCH ERROR COMPENSATING SYSTEM

[75] Inventors: Takao Sasaki, Hachioji; Kentaro Fujibayashi, Musashino; Toshiaki Otsuki, Hino; Ryouji Eguchi, Yamanashi, all of Japan

[73] Assignee: Fanuc Ltd., Minamitsuru, Japan

[21] Appl. No.: 778,068

[22] PCT Filed: Apr. 10, 1991

[86] PCT No.: PCT/JP91/00498

§ 371 Date: Dec. 2, 1991

§ 102(e) Date: Dec. 2, 1991

[87] PCT Pub. No.: WO91/16173

PCT Pub. Date: Oct. 31, 1991

[30] Foreign Application Priority Data

Apr. 26, 1990 [JP] Japan ................................. 2-111551

[51] Int. Cl.⁵ .............................................. G06F 15/46
[52] U.S. Cl. .......................... 364/474.35; 364/474.28
[58] Field of Search ................... 364/474.35; 318/570, 318/571, 603

[56] References Cited

U.S. PATENT DOCUMENTS 4,864,508 9/1989 Iwagaya ........................ 364/474.19
5,210,478 5/1993 Sasaki et al. ................... 364/474.35

FOREIGN PATENT DOCUMENTS 0063613 11/1982 European Pat. Off. .
48-2285 1/1973 Japan .
48-54390 7/1973 Japan .
49-50583 5/1974 Japan .
50-127076 10/1975 Japan .
60-230203 11/1985 Japan ........................... G05B 19/18

Primary Examiner—Long T. Nguyen
Assistant Examiner—Cameron H. Tousi
Attorney, Agent, or Firm—Staas & Halsey

[57] ABSTRACT

A pitch error compensating system compensates for a pitch error of a ball screw of a numerically controlled machine tool. A pitch error calculating means (4) reads a present value from a present value register (3), reads pitch error corrective quantities ($\epsilon n$, $\epsilon pn$) in a corresponding period, and outputs pitch error corrective quantities as pitch error corrective pulses (CP) at equal intervals in the period. The pitch error corrective pulses (CP) are added to interpolated pulses (CP) by an adder (5). Since the pitch error corrective quantities are not outputted all at once, the machine tool moves smoothly, and the quality of the machined surface of the workpiece is improved.

4 Claims, 5 Drawing Sheets

PITCH ERROR COMPENSATING SYSTEM

BACKGROUND OF THE INVENTION

1. Field of the Invention

The present invention relates to a system for compensating for a pitch error of a ball screw in a numerically controlled machine tool, and more particularly to a pitch error compensating system suitable for precision machining.

2. Description of Related Art

Ball screws for controlling movable components of numerically controlled machine tools do not have accurately constant pitches. Pitch errors of such ball screws are compensated for by computerized numerical control apparatus to increase positioning accuracy. According to a general pitch error compensating system, the strokes of respective axes are divided into suitable periods, and pitch error corrective quantities are measured in the respective periods. The measured corrective quantities are then stored in a nonvolatile memory. Each time an axis moves, the pitch error corrective quantity that corresponds to the present value of the axis is read from the memory, and added to or subtracted from interpolated pulses, thereby compensating the pitch error.

FIG. 6 of the accompanying drawings shows, by way of example, pitch error corrective pulses in a conventional pitch error compensating system. In FIG. 6, a first period $P_0-P_1$ has a pitch error corrective quantity $\epsilon 1$, a second period $P_1-P_2$ a pitch error corrective quantity $\epsilon 2$, and a third period $P_2-P_3$ has a pitch error corrective quantity $\epsilon 3$, each period being indicated as a pitch error correcting period l. The pitch error corrective quantity in each period is outputted as a pitch error corrective pulse at an intermediate point of the period, and added to interpolated pulses.

A pitch error corrective quantity is outputted at once as a pitch error corrective pulse. If the pitch error corrective quantity is large, then the corresponding error corrective pulse is also large. The large error corrective pulse that is outputted at once is not preferable from the standpoint of positioning accuracy. Such pitch error corrective pulse may lower the quality of the machined surface in precision machining.

SUMMARY OF THE INVENTION

In view of the aforesaid drawbacks of the conventional system, it is an object of the present invention to provide a pitch error compensating system which is capable of smoothing the movement of a machine.

To achieve the above object, there is provided a system for compensating for a pitch error of a ball screw of a numerically controlled machine tool, comprising a memory for storing pitch error corrective data, a present value register for integrating output pulses from interpolating means and storing a present value, pitch error calculating means for reading said present value and outputting pitch error corrective quantities at equal intervals in a period having said present value, and an adder for adding interpolated pulses from said interpolating means and said pitch error corrective quantities, and outputting sum pulses to an axis control circuit.

The pitch error calculating means reads a present value, reads pitch error corrective data, and outputs pitch error corrective quantities as pitch error corrective pulses at equal intervals in the period. The pitch error corrective pulses are added to interpolated pulses. Since the pitch error corrective quantities are not outputted all at once, the machine tool moves smoothly, and the quality of the machined surface of the workpiece is improved.

DESCRIPTION OF THE PREFERRED EMBODIMENTS

An embodiment of the present invention will hereinafter be described with reference to the drawings.

Figure 1:
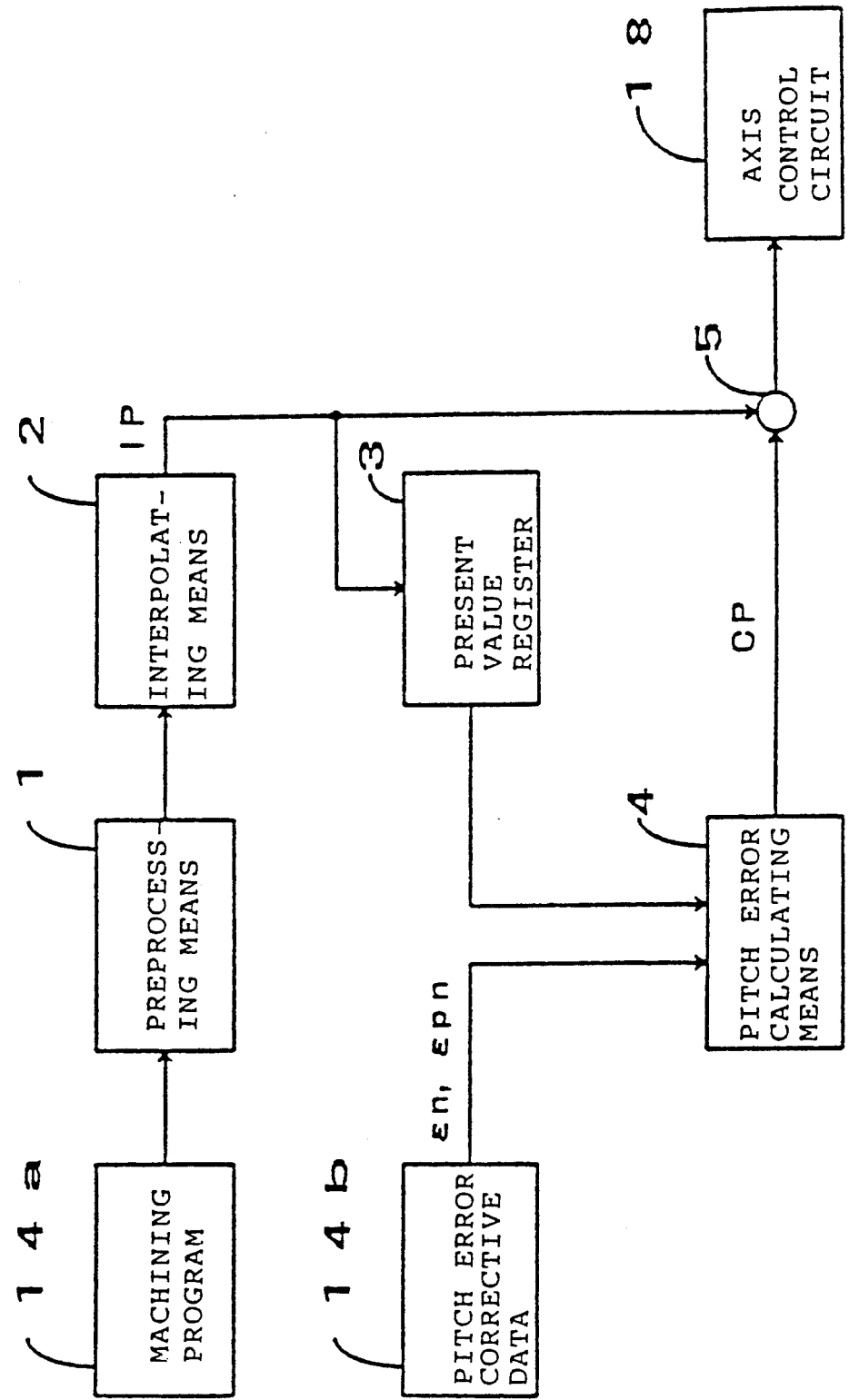
FIG. 1 is a block diagram of a pitch error compensating system according to the present invention.

FIG. 1 shows in block form a pitch error compensating system according to the present invention. For the sake of brevity, the pitch error compensating system is shown as compensating for a pitch error of a single axis.

In the pitch error compensating system shown in FIG. 1, a machining program 14a is read by a preprocessing means 1, and decoded thereby into pulse-interpolatable data that is sent to an interpolating means 2. The interpolating means 2 interpolates the data and outputs interpolated pulses IP to an adder 5. The interpolated pulses IP are also supplied to a present value register 3 which integrates the interpolated pulses IP and holds a present value. Pitch error corrective data 14b represent data in the stroke of the axis as it is divided into equal intervals, and has a pitch error corrective quantity $\epsilon n$ and an accumulated pitch error corrective quantity $\epsilon pn$ up to a first point of the present value in each of the periods.

The pitch error compensating system also has a pitch error calculating means 4 that reads the present value of the axis from the present value register 3, and also reads a pitch error corrective quantity $\epsilon n$ corresponding to the period that has the present value and an accumulated pitch error corrective quantity $\epsilon pn$ up to a first point of the present value, in constant periodic cycles. The pitch error calculating means 4 then produces pitch error corrective pulses CP from the read data, and outputs them at equal intervals to the adder 5. The adder 5 adds the interpolated pulses IP and the pitch error corrective pulses CP, and output the added pulses as output pulses to an axis control circuit 18. In response to the output pulses, the axis control circuit 18 controls a servomotor (described later on).

The pitch error calculating means 4 outputs the pitch error corrective quantity at equal intervals in the period, as described in detail later on.

Figure 2:
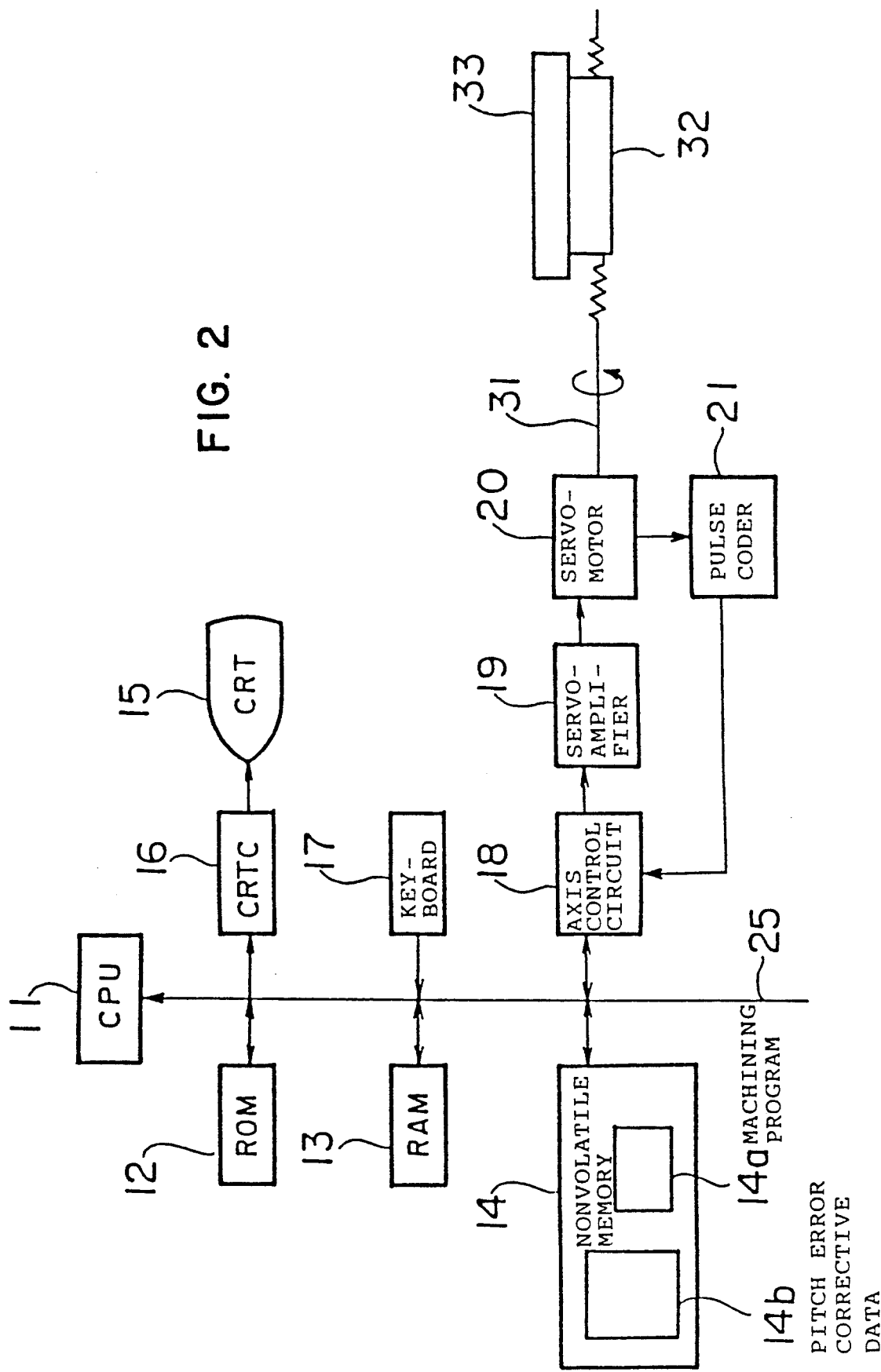
FIG. 2 is a block diagram of the hardware arrangement of a computerized numerical control (CNC) apparatus for implementing the pitch error compensating system according to the present invention.

FIG. 2 shows in block form the hardware arrangement of a computerized numerical control (CNC) apparatus which implements the pitch error compensating system according to the present invention. The computerized numerical control apparatus includes a processor 11 for controlling the apparatus in its entirety according to a system program stored in a ROM 12. The ROM 12 comprises an EPROM or an EEPROM. A RAM 13, which comprises an SRAM, stores various data. A nonvolatile memory 14 stores a machining program 14a, pitch error corrective data 14b, parameters, etc. The nonvolatile memory 14 comprises a CMOS memory or the like that is backed up by a battery, so that it holds the stored program and data even after the power supply of the computerized numerical control apparatus is turned off.

The computerized numerical control apparatus also has a graphic control circuit 16 for converting the data stored in the RAM 13, such as the present position and displacement of each axis, into display signals, and transmitting the display signals to a display unit 15, which displays the display signals. The display unit 15 may comprise a CRT, liquid crystal display, or the like. Various data can be entered into the apparatus through a keyboard 17.

An axis control circuit 18 receives position commands from the processor 11, i.e., the output pulses produced by adding the interpolated pulses IP and the pitch error corrective pulses CP described with reference to FIG. 1, and outputs a speed command signal to a servoamplifier 19 to control a servomotor 20. The servoamplifier 19 amplifies the speed command signal, and energizes the servomotor 20 with the amplified speed command signal. To the servomotor 20, there is coupled a pulse coder 21 for feeding position feedback pulses back to the axis control circuit 18. A position detector such as a linear scale or the like may be used in place of the pulse coder 21.

A ball screw 31 is also coupled to the servomotor 20 and is threaded through a nut 32 fixed to a table 33 for controlling movement of the table 33. A pitch error of the ball screw 31 is compensated for by the pitch error corrective pulses CP for improving the accuracy with which the table 33 is positioned. Since the pitch error corrective pulses CP are outputted at equal intervals according to the present invention, the table 33 moves smoothly, improving the surface of a workpiece which is being machined. There are actually as many axis control mechanisms as the number of axes required, but only the axis control mechanism for one axis is illustrated here as the axis control mechanisms are identical to each other.

A PMC (programmable machine controller), an input/output circuit connected thereto, a spindle control circuit for controlling a spindle, a spindle amplifier, a spindle motor, and other elements are omitted from illustration.

While only one processor is used in the illustrated embodiment, a multi-processor system composed of a plurality of processors may be employed depending on the entire system.

Figure 3:
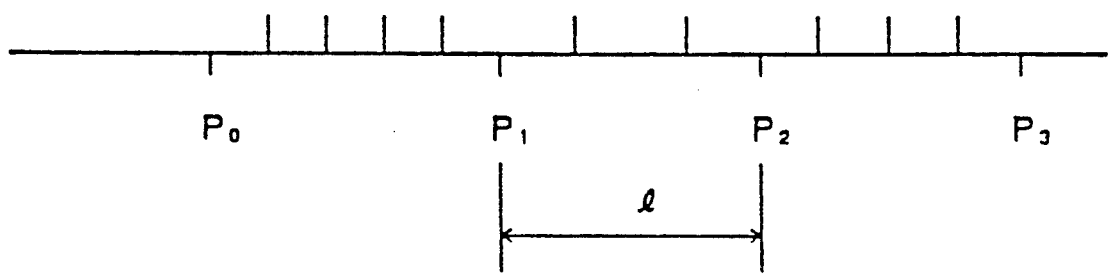
FIG. 3 is a diagram showing the manner in which pitch error corrective pulses are outputted.

FIG. 3 shows the manner in which pitch error corrective pulses are outputted. Pitch error corrective quantities $\epsilon n$ in respective periods are given below. Usually, one pulse has a duration of 1 $\mu$m. However, one pulse may be 10 $\mu$m or may be expressed in an angular unit. Indicated by l is the length of a pitch error correcting period.

Between $P_0$ and $P_1$: 4 pulses
Between $P_1$ and $P_2$: 2 pulses
Between $P_2$ and $P_3$: 3 pulses Therefore, the pitch error calculating means 4 shown in FIG. 1 reads the pitch error corrective quantities (4 pulses, 2 pulses, and 3 pulses in the illustrated embodiment) corresponding to the periods that have a present value, and outputs the pitch error corrective quantities at equal intervals as shown in FIG. 3.

Figure 4:
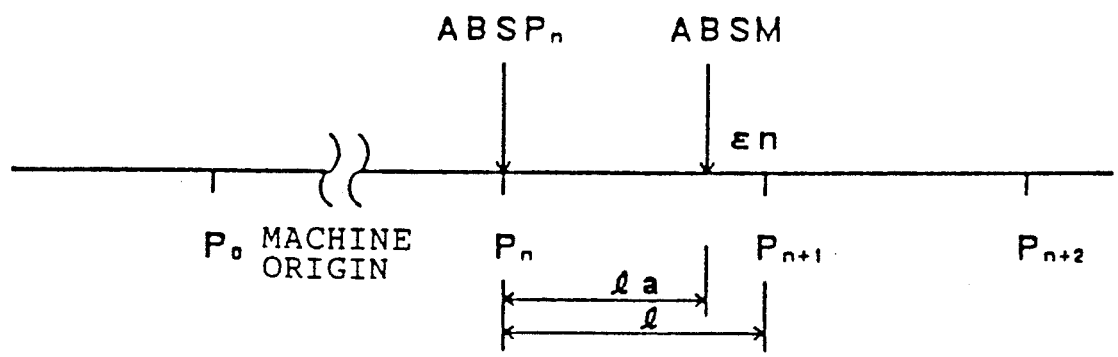
FIG. 4 is a diagram illustrative of the manner in which a pitch error calculating means calculates pitch error corrective pulses.

FIG. 4 shows the manner in which the pitch error calculating means 4 calculates pitch error corrective pulses. It is assumed that a machine origin is indicated by $P_0$, a present value by ABSM, a first point of the period having the present value ABSM by $P_n$, a coordinate of the point $P_n$ by $ABSP_n$, an ending point of the period by $P_{n+1}$, a pitch error corrective quantity in the period by $\epsilon$, and the length of a pitch error correcting period by l.

Figure 5:
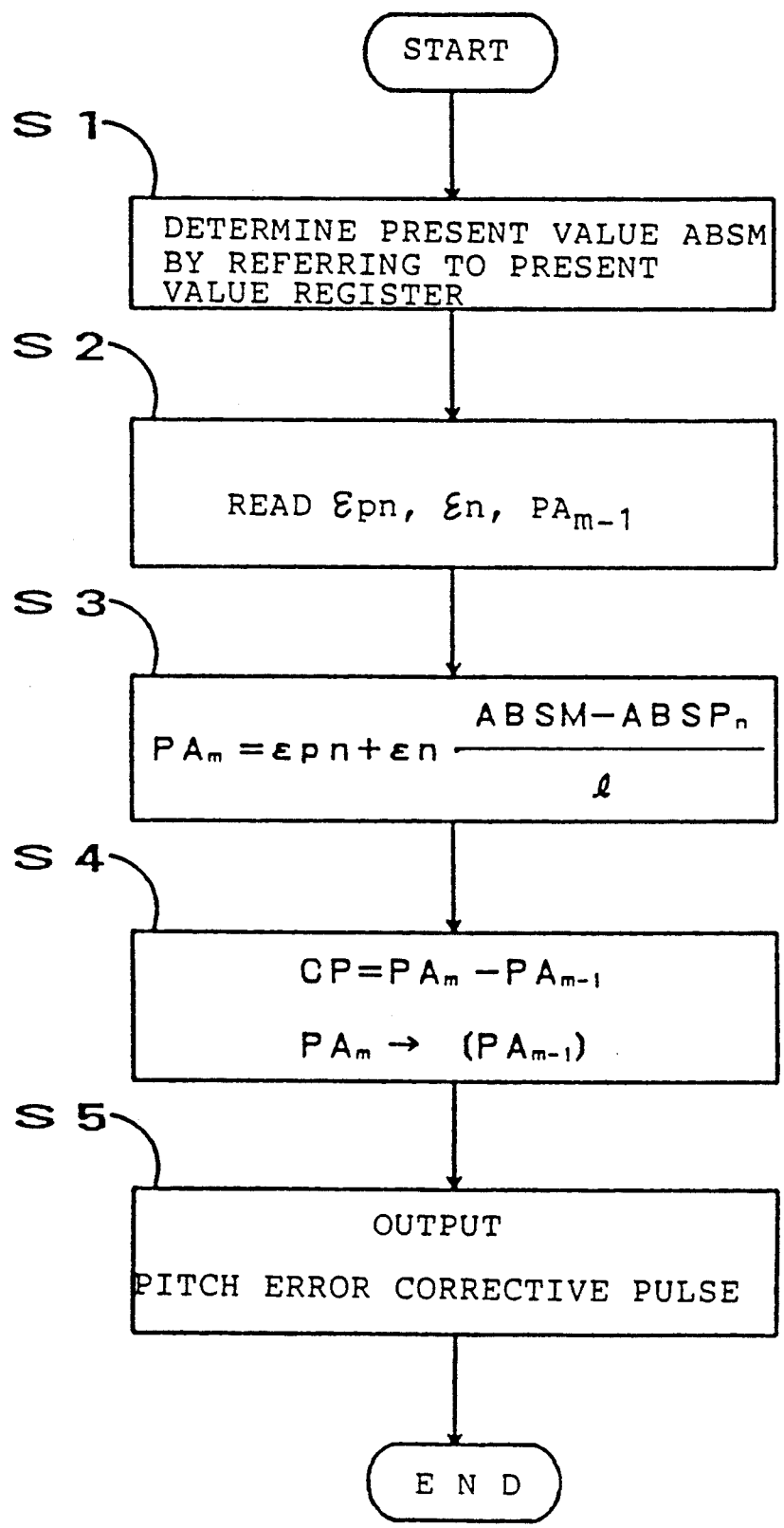
FIG. 5 is flowchart of a processing sequence of the pitch error calculating means.
Figure 6:
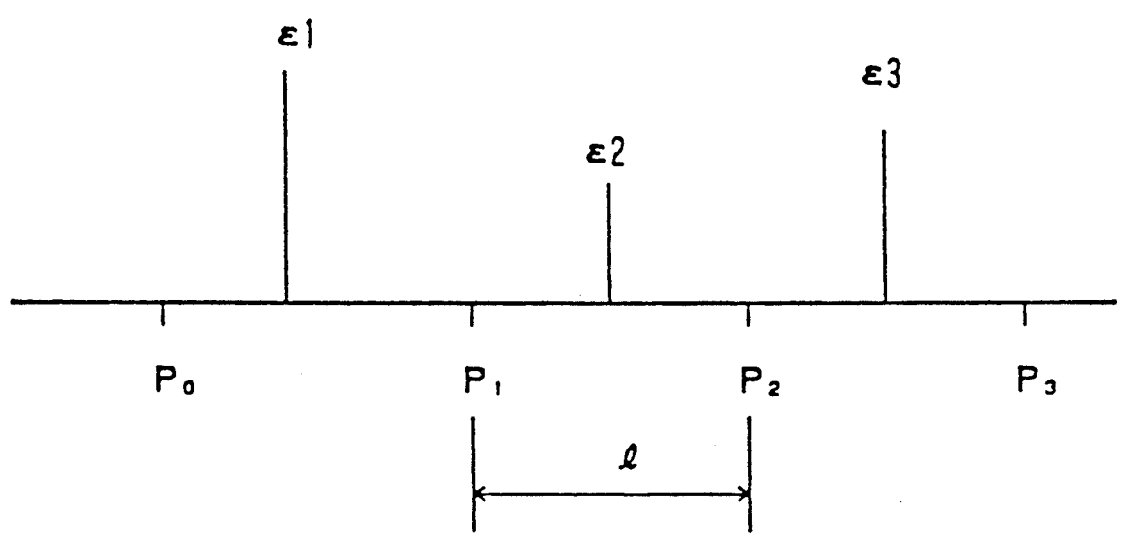
FIG. 6 is a diagram illustrative of pitch error corrective pulses in a conventional pitch error compensating system.

FIG. 5 is flowchart of a processing sequence of the pitch error calculating means. The numerals following the letter S indicate step numbers in FIG. 5.

[S1] The present value ABSM is determined by referring to the present value register 3.

[S2] Accumulated pitch error corrective quantities $\epsilon pn$ from the machine origin $P_0$ up to the point $P_n$, a pitch error corrective quantity $\epsilon n$ in the period $P_n - P_{n+1}$, and previous accumulated pitch error corrective quantities $PA_{m-1}$ are read from the pitch error corrective data 14b.

[S3] Accumulated pitch error corrective quantities $PA_m$ at the present value ABSM are calculated by adding, to the accumulated pitch error corrective quantities $\epsilon pn$ up to the point $P_n$, pitch error corrective pulses to be outputted at equal intervals up to the present value in the period, as determined according to the following equation:

$$\epsilon n \cdot (ABSM - ABSP_n)/l = \epsilon n \cdot (la/l).$$

This equation represents a value produced by proportionally distributing the pitch error corrective quantities $\epsilon n$ to a distance la in the pitch error correcting period l, where the distance la extends from the point Pn to the present value ABSM.

[S4] Pitch error corrective pulses $C_p$ are determined as the difference between the accumulated pitch error corrective quantities $PA_m$ at the present value ABSM and the previous accumulated pitch error corrective quantities $PA_{m-1}$. Also, the previous accumulated pitch error corrective quantities $PA_{m-1}$ are replaced with the new accumulated pitch error corrective quantities $PA_m$. The accumulated pitch error corrective quantities $PA_m$ are then stored among the pitch error corrective data 14b.

[S5] When the value of pitch error corrective pulses CP becomes 1 or more, one pulse is outputted.

According to the above process, the pitch error calculating means 4 can output pitch error corrective pulses at equal intervals. While more than one pitch error corrective pulse may be outputted when the speed of movement is very high, one pitch error corrective pulse is normally outputted at a time.

The accumulated pitch error corrective quantities are employed in the above embodiment because the calculating period of the pitch error calculating means 4 may not necessarily be in conformity with the pitch error correcting period.

With the present invention, as described above, since pitch error corrective pulses are outputted at equal intervals in each pitch error correcting period, the machine moves smoothly, thereby improving the quality of the machined surface of the workpiece.

We claim:

1. A system supplied with interpolated pulses based on a machining program, for compensating for a pitch error of a ball screw of a numerically controlled machine tool, which is controlled by an axis control circuit to move the numerically controlled machine tool along an axis, comprising:

a memory for storing pitch error corrective data;

a present value register for integrating the interpolated pulses to generate a present value and for storing said present value;

pitch error calculating means for reading said present value and for generating and outputting pitch error corrective quantities based on said present value, at equal intervals in a period corresponding to said present value, said period representing a position increment along the axis along which the numerically controlled machine tool can be moved; and an adder for adding the interpolated pulses and said pitch error corrective quantities, to generate and output sum pulses to the axis control circuit.

2. A system according to claim 1, wherein said pitch error calculating means comprises means for adding accumulated pitch error quantities from a machine origin on the axis, up to a first point of the period having said present value and pitch error corrective pulses to be outputted from said point up to the present value, to produce accumulated pitch error quantities at the present value, and for determining pitch error corrective pulses as the difference between said accumulated pitch error corrective quantities and accumulated pitch error corrective quantities in a previous calculating cycle of the system.

3. A system supplied with interpolated pulses based on a machining program of a numerically controlled machine, the system compensating for a pitch error of a ball screw for controlling an axis of the numerically controlled machine, comprising:

a memory to store pitch error corrective data in correspondence with position increments along the axis;

a present value register coupled to receive the interpolated pulses, to integrate the interpolated pulses to generate a present value and to store the present value;

a pitch error calculator coupled to the memory and the present value register, to read the present value and to generate and output pitch error corrective quantities based on the present value, at equal intervals in one of the position increments corresponding to the present value, the pitch error calculator including a first adder to add accumulated pitch error quantities from a machine origin on the axis, up to a first point of the one of the position increments corresponding to the present value, and the pitch error corrective pulses to be output from the point up to the present value, to produce accumulated pitch error quantities at the present value, and a subtractor to generate pitch error pulses as the difference between the accumulated pitch error corrected quantities and accumulated pitch error corrected quantities in a previous calculating cycle of the system; and a second adder coupled to the pitch error calculator and to receive the interpolated pulses, for adding the interpolated pulses and the pitch error corrective quantities, to generate sum pulses to control the ball screw.

4. A system as claimed in claim 3, wherein the pitch error calculator has a calculating period at which the pitch error calculator outputs pitch error corrective quantities, and wherein the calculating period does not correspond with the one of the position increments.

* * * * *

UNITED STATES PATENT AND TRADEMARK OFFICE
CERTIFICATE OF CORRECTION

PATENT NO. : 5,309,367
DATED : May 3, 1994
INVENTOR(S) : Takao SASAKI, et al.

It is certified that error appears in the above-indentified patent and that said Letters Patent is hereby corrected as shown below:

Col. 1, line 34, change "1" to --$\ell$--.

Col. 3, line 64, change "1" to --$\ell$--.

Col. 4, line 35, change "1" to --$\ell$--.

Equation:

Change "1=en.(1a/1)" to

--$\ell$ = en.($\ell$a/$\ell$)--.

Line 39, change "1a" to --$\ell$-- and change "1" to --$\ell$--.

Col. 4, line 40, change "1a" to --$\ell$a--.

Signed and Sealed this

Twenty-sixth Day of March, 1996

Attest:

BRUCE LEHMAN

Attesting Officer       Commissioner of Patents and Trademarks